US007884335B2

(12) United States Patent
Hallam et al.

(10) Patent No.: US 7,884,335 B2
(45) Date of Patent: Feb. 8, 2011

(54) WATER TREATMENT SYSTEM

(75) Inventors: Robert T. Hallam, Rancho Santa fe, CA (US); Angelo V. Pugliese, Vista, CA (US)

(73) Assignee: Dimension One Spas, Inc., Vista, CA (US)

( * ) Notice: Subject to any disclaimer, the term of this patent is extended or adjusted under 35 U.S.C. 154(b) by 412 days.

(21) Appl. No.: 12/016,841

(22) Filed: Jan. 18, 2008

(65) Prior Publication Data

US 2009/0185953 A1    Jul. 23, 2009

(51) Int. Cl.
*G01N 23/12*    (2006.01)
(52) U.S. Cl. ................. 250/432 R; 422/24; 210/748.08
(58) Field of Classification Search .............. 250/432 R
See application file for complete search history.

(56) References Cited

U.S. PATENT DOCUMENTS

| | | | |
|---|---|---|---|
| 4,204,956 A * | 5/1980 | Flatow | 210/87 |
| 5,665,228 A | 9/1997 | Leaverton | |
| 5,935,431 A * | 8/1999 | Korin | 210/205 |
| 6,117,335 A * | 9/2000 | Bender | 210/745 |
| 6,921,476 B2 * | 7/2005 | Abe et al. | 210/96.1 |

* cited by examiner

*Primary Examiner*—Phillip A Johnston
(74) *Attorney, Agent, or Firm*—Fitch, Even, Tabin & Flannery

(57)    ABSTRACT

The present invention provides a system for water treatment. The system includes a chamber, a UV light source, and a housing. The chamber has an inlet for receiving ozone mixed water and a transparent portion configured to allow UV light to pass. The UV light source has a protective shell that comprises a first portion and a second portion, the first and second portions configured to pass UV light at a first and second wavelength, respectively. The housing having an air inlet and an air outlet, the housing configured to secure the UV source and to receive a portion of the chamber, wherein the UV source and the chamber is affixed to the housing such that the transparent portion of the chamber is exposed to the first portion of the protective shell, thereby exposing the ozone mixed water to UV light with the first wavelength, and wherein the second wavelength convert oxygen molecules from the air inlet into ozone molecules.

21 Claims, 4 Drawing Sheets

WATER TREATMENT SYSTEM

TECHNICAL FIELD

The present invention relates to a water treatment system, and more particularly, some embodiments relate to an ozone and UV water treatment system.

DESCRIPTION OF THE RELATED ART

Ozone is an effective sanitizer because of its strong oxidizing properties. Ozone has been used in spas and municipal water systems for many years. However, because it is a strong oxidizer, ozone is considered a toxic substance. This has led the EPA to impose an exposure limit to ozone. Also, UL (Underwriters Laboratories) 1563 Standard for spas and hot tubs sets a limit for residual ozone emitted from a spa. The ozone mixing system described in U.S. Pat. No. 5,665,228 (Leaverton et al.), which is incorporated herein in its entirety, is an effective method to enable spas to conform to the residual ozone levels set by UL 1563.

Most water treatment systems that use ozone to sanitize water also use other sanitizer materials such as salt generators, chlorine, or other halogens in conjunction with the ozone to effectively sanitize the water by maintaining the residual sanitizer at an acceptable level.

Germicidal ultraviolet light is also an effective sanitizer and has also been used for many years in municipal water systems. Germicidal UV sanitizing systems are now being implemented in some swimming pools. Similar to the ozone sanitizing system, the UV sanitizing system is a contact system but without residual sanitizer. In most commercially available germicidal UV systems, the water is in direct contact with the UV lamp. This poses a potential electrical hazard. Additionally, growth accumulations on the lamp glass require a method of cleaning to maintain effectiveness.

BRIEF SUMMARY OF EMBODIMENTS OF THE INVENTION

According to various embodiments of the invention, systems for water treatment are provided. In accordance with one embodiment of the invention, a system for water treatment system comprising: a chamber having an inlet for receiving ozone mixed water and a transparent portion configured to allow UV light to pass; a UV light source having a protective shell that comprises a first portion and a second portion, the first and second portions configured to pass UV light at a first and second wavelength, respectively; and a housing having an air inlet and an air outlet, the housing configured to secure the UV source and to receive a portion of the chamber. The UV source and the chamber is affixed to the housing such that the transparent portion of the chamber is exposed to the first portion of the protective shell, thereby exposing the ozone mixed water to UV light with the first wavelength. The transparent portion may comprise of quartz, glass, or plastic. The second wavelength converts oxygen molecules from the air inlet into ozone molecules.

In one embodiment, the chamber comprises entirely of the transparent portion. Additionally, the first wavelength is set at a wavelength where micro organisms are killed and ozone molecules are disassociated. The second wavelength is set at a wavelength where oxygen molecules are converted to ozone molecules. In yet another embodiment, the first wavelength is approximately 260 nanometers, and the second wavelength is approximately 185 nanometers.

In a further embodiment, the transparent portion is configured to allow UV light to pass without altering a wavelength characteristic of the UV light.

In yet another embodiment, the first and second wavelengths are of the UV light are the same, and wherein the transparent portion of the chamber is configured to alter the first wavelength such that it will eliminate micro-organisms and disassociate ozone molecules.

In one embodiment, a wavelength transformer is placed inside the housing between the first portion and the transparent portion of the chamber. The wavelength transformer is configured to transform the first wavelength into a second wavelength such that it will eliminate micro-organisms and disassociate ozone molecules.

In yet another embodiment, wherein the first and second wavelengths are selected such that they convert oxygen molecules into ozone molecules. In a further embodiment, air inlet and outlet are positioned such that air flow from the air inlet passes through the first and second portions to the air outlet In a further embodiment of the invention, a sanitizing system comprises: a chamber to hold a water-ozone combination fluid, the chamber having a transparent wall; and a UV light assembly having a first portion and a second portion, wherein the first portion being coupled to the chamber such that the transparent wall is exposed to UV light generated by a UV light source in the UV light assembly. The second portion is configured to convert oxygen molecules into ozone molecules. The first portion is configured to transmit UV light at a first wavelength that kill micro-organisms and separate ozone molecules. The chamber may comprise entirely of the transparent wall.

In an embodiment, the second portion is configured to transmit UV light at a second wavelength that converts oxygen molecules to ozone molecules. The second wavelength has a range of 170-200 nanometers.

In a further embodiment, the transparent wall comprises quartz, glass, or plastic.

In yet another embodiment, the transparent wall is configured to allow UV light to pass without altering a wavelength characteristic of the UV light.

In a further embodiment, the sanitizing system further includes a wavelength converter disposed between the UV light source and the chamber. The wavelength converter converts a wavelength of the UV light to a second wavelength that kills micro-organisms and separates ozone molecules.

In yet another embodiment, the UV assembly further comprises an air inlet and an air outlet that are positioned such that air flow from the air inlet passes through the first and second portions of the UV assembly. Alternatively, the UV assembly further comprises an air inlet and an air outlet that are positioned such that air flow from the air inlet passes only through the second portion of the UV assembly.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

1. Overview

Before describing the invention in detail, it is useful to describe an example environment in which the invention may be implemented. In one embodiment, the invention can be implemented in a spa or a hot tub.

Figure 1:
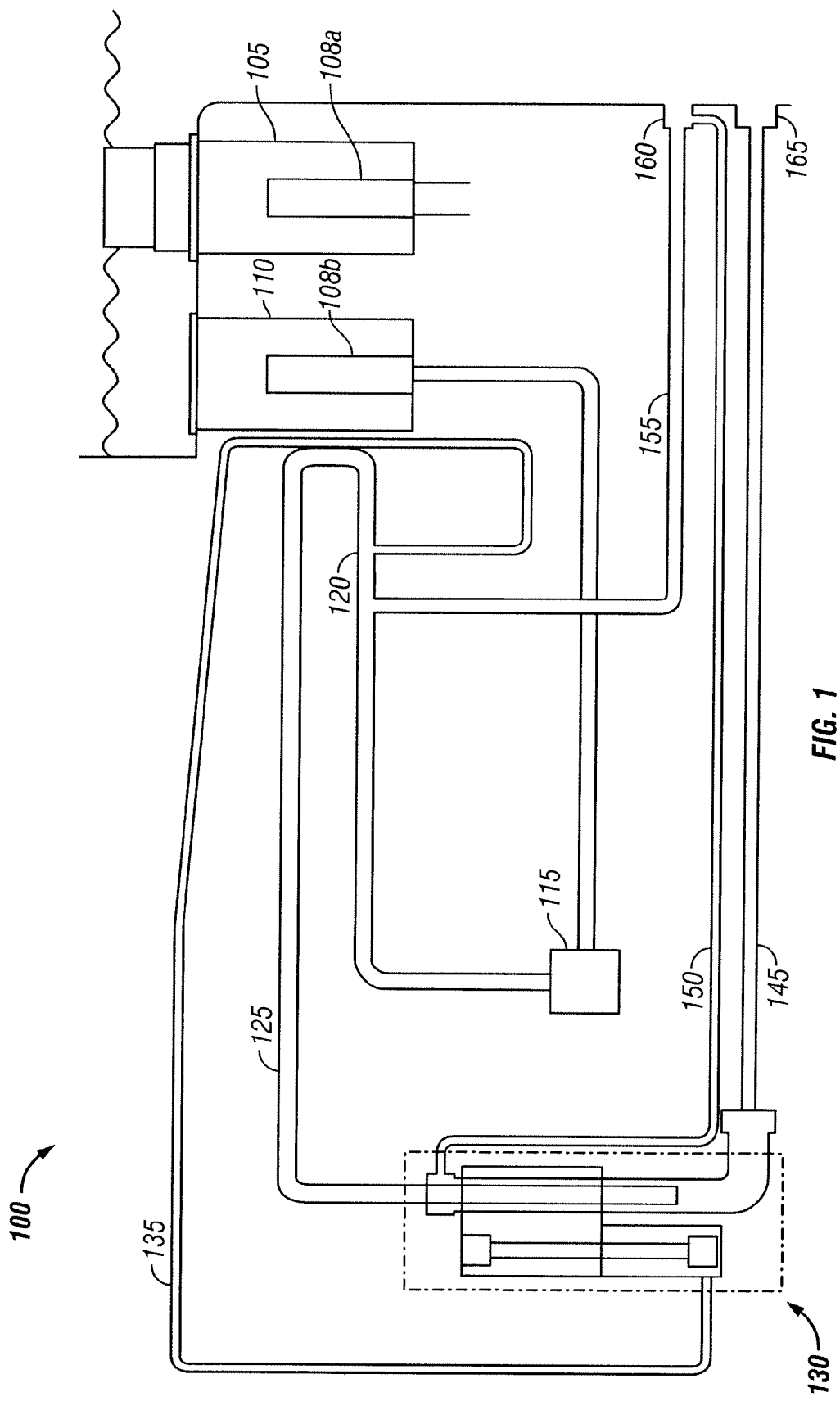
FIG. 1 illustrates an example environment in which an ozone-UV sanitizing system is implemented according to an embodiment of the present invention.

FIG. 1 illustrates an exemplary environment in which an embodiment of a sanitation system 100 may be implemented. As shown, sanitation system 100 is being implemented to sanitize water of a spa. System 100 includes intake filters 105 and 110, a circulation pump 115, water and ozone mixer 120, a sanitizing system 130, return pipes 145 and 150, and water outlets 160 and 165.

Filter 105 receives water from a skimmer located on top of filter 105. Filter 105 can include multi-stage filters 108a-b. Filters 108a-b may include a wire-mesh for trapping large particles and a fine filtering layer for trapping fine particles and large organisms. Filters 108a-b may also include a carbon layer for additional water purification capability.

Water filtered by filter 108a is fed back into the spa via a jet pump. Water filtered by filter 108b is fed to the water-ozone mixer 120 and sanitizing system 130 via a circulation pump 115.

Water-ozone mixer 120 receives water from circulation pump 115 and ozone gas from sanitizing system 130 via conduit 135. Water-ozone mixer 120 mixes water and ozone together using a Venturi tube, injection device, or other injection device. Generally, the mixture of water and ozone gas occurs as the velocity of the water increases and the pressure drops inside water-ozone mixer 120. Once the water and ozone gas are mixed, the ozone-water mixture (ozonated water) is fed to sanitizing system 130 via conduit 125. Conduit 125 is designed with a length such that the traverse time of the ozonated water from the water-ozone mixture 120 to sanitizing system 130 is sufficiently long for the ozone to kill bacteria and micro-organisms in the water.

In one embodiment, sanitizing system 130 generates UV light having a range of wavelengths that kills bacteria and micro-organisms in the water while also separating or disassociating toxic ozone ($O_3$) molecules into harmless oxygen ($O_2$) molecules from the ozonated water prior to returning the water to the spa. This helps reduce ozone exposure. In another portion of sanitizing system 130, UV light having a second range of wavelengths is generated to convert oxygen molecules into ozone molecules, according to one embodiment.

The generated ozone gas is then collected and forwarded via conduit 135 to water-ozone mixer 120 for mixing with water from the spa.

Sanitizing system 130 also includes an gas recovery or separation portion to recover any ozone gas not disassociated by the system. The recovered ozone gas are forwarded to outlet 160 via a conduit 150 to be mixed with filtered water from a conduit 155. Water from conduit 155 is filtered but not treated with ozone. Any excess ozone from sanitizing system 130 is remixed with water from conduit 155 to kill bacteria and micro-organisms contained in the water of the spa. It should be noted that the level of ozone returned via outlet 160 preferably conforms to UL 1563. As shown, water that has been both treated with ozone and germicidal UV light is returned to the spa via outlet 165.

Sanitizing system 130 can be implemented to provide the dual benefits of an ozone-based sanitation system and a germicidal UV-based sanitation system. Typically, the ozone-based sanitation system alone is sufficient for cleaning water. However, by combining the ozone-based system with the germicidal UV-based system, a cleaner, more efficient and healthier system is obtained. In the combined system, bacteria or micro-organisms that somehow survive the ozone stage can be killed by the germicidal UV light. Additionally, excess ozone gas (not absorbed by the water) will be at least partially disassociated to oxygen gas. In this way, sanitizing system 130 can better meet the UL 1563 standard.

2. The Ozone-UV Sanitizing System

Figure 2:
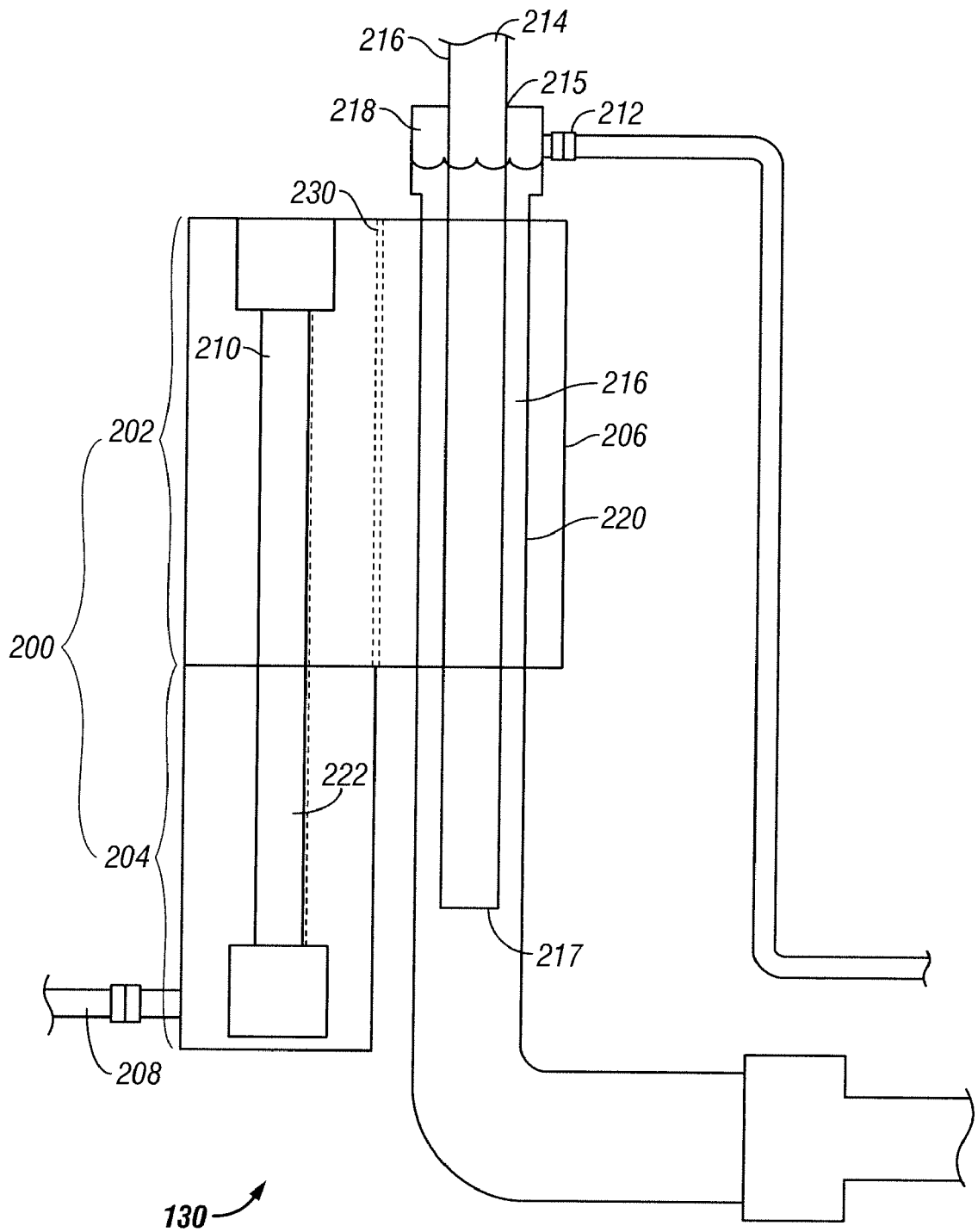
FIGS. 2-4 illustrate example embodiments of the ozone-UV sanitizing system according to embodiments of the present invention.
Figure 3:
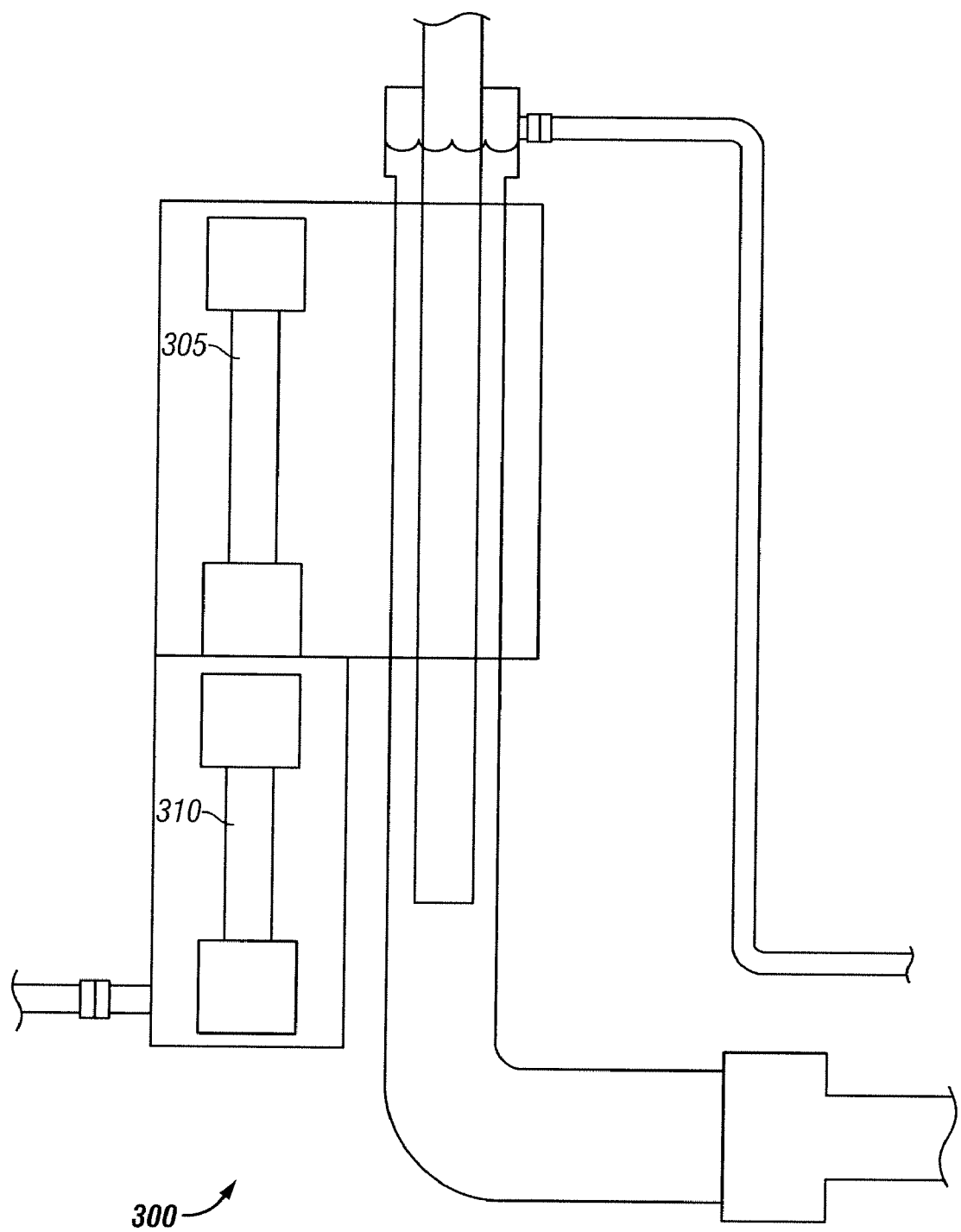

FIG. 2 illustrates in detail an example sanitizing system 130 according to one embodiment. System 130 includes a housing 200, a UV light source 210, and a chamber assembly 220. Housing 200 comprises two portions 202 and 204. Portions 202 and 204 envelop a UV light bulb 210. In one embodiment, each portion has its own UV light bulb. In this way, there are two different UV bulbs in housing 200, as shown in FIG. 3, which will be discussed in detail below.

Chamber assembly 220 includes an outer shell or pipe 216 having an opening 215 for receiving a conduit or pipe 214, which delivers ozonated water into the interior of outer shell 216. Pipe 214 is positioned such that its outlet 217 is at a depth inside of outer shell 216. In this way, excess ozone gas from the ozonated water entering from outlet 217 will rise up to a collection chamber or opening 218, which has an outlet 212 to direct the excess ozone to outlet 160 (as shown in FIG. 1). In one embodiment, outer shell 216 is made of quartz, glass, clear plastic, or other transparent material such that the material does not alter the germicidal and ozone disassociation aspects of the UV light coming from bulb 210. In an alternative embodiment, only a portion of outer shell 216 is made with one of the transparent materials listed above. Preferably, only the portion that is encased by housing 202 is made with a transparent material.

UV light bulb 210 is selected to transmit a range of wavelengths that is lethal to bacteria and micro-organisms while simultaneously separating and disassociating ozone molecules into oxygen molecules. In one embodiment, UV light bulb 210 is a mercury vapor bulb. In another embodiment, UV light bulb 210 has a wavelength range of 250-280 nanometers. Preferably, UV bulb 210 is approximately 260 nanometers. Other wavelengths that also kill bacteria and micro-organisms could also be used.

Because outer shell 216 is transparent, the ozonated water and excess ozone gas inside of shell 216 will be exposed to the UV light generated by bulb 210. In this way, some or all of the bacteria and micro-organisms still alive in the ozonated water will be killed. Additionally, excess ozone and some of the ozone in the water will be mostly disassociated into harmless oxygen molecules. To maximize the ozonated water exposure to the UV light, housing 202 includes a reflector 206 on the opposite side of the housing where UV light bulb 210 is affixed. In one embodiment, reflector 260 completely surrounds housing 202.

For a single-bulb system, as shown in FIG. 2, the wavelengths or range of wavelengths should be different between section 202 and 204. As mentioned, UV light in section 202 is germicidal and disassociates ozone molecules. In contrast, section 204 has a UV light wavelength characteristic such that it creates ozone molecules from normal oxygen molecules. Accordingly, section 204 preferably emits a different wavelength or range of wavelengths from section 202.

In one embodiment, the portion of light bulb 210 that is encased by section 204 is coated with a layer 222 of materials to serve as a band-pass filter such that the wavelengths that are detriment to the existence of ozone molecules are eliminated. In this way, the coating allows wavelengths that are favorable to the production of ozone molecules to pass. Alternatively, layer 222 may alter the wavelength of the UV light such that it can be used to create ozone molecules from oxygen molecules.

In an alternative embodiment, a coating 220 is applied to a portion of bulb 210 that is inside of section 202 such that the coating filters out ozone friendly wavelength. In this embodiment, UV bulb 210 may transmit a broad range of wavelengths in the UV spectrum in order to include a wavelength for killing bacteria and micro-organisms, a wavelength for disassociating ozone molecules, and a wavelength for creating ozone molecules. Additionally, the portion of UV bulb 210 in sections 202 and 204 can be coated accordingly to yield a desired wavelength or range of wavelengths.

In an alternative embodiment, UV bulb 210 is not coated in section 202. Instead, a physical band-pass filter 230 may be placed between bulb 210 and outer shell 216 of chamber assembly 220. In this way, band-pass filter 230 may pass only a desired range of wavelengths. Band-pass filter 230 may be made of glass, quartz, or other suitable transparent material and may be coated with paint or other material to act as a filter. Alternatively, band-pass filter 230 is not used, but instead the transparent material of outer shell 216 is selected such that it can act as a band-pass filter. In this way, outer shell 216 only allows germicidal and ozone unfriendly/disassociating UV light to pass.

FIG. 3 illustrates sanitizing system 300 in accordance with another embodiment of the present invention. Sanitizing system 300 is similar to system 130 and may incorporate some or all of the features included in two separate UV bulbs, 305 and 310. Bulb 305 is configured to transmit UV light at a wavelength or range of wavelengths that is germicidal while also having ozone disassociating property. Bulb 310 is configured to convert oxygen molecules into ozone molecules. In one embodiment, bulb 310 is configured to transmit UV light with a wavelength range of 170-200 nanometers. Preferably, bulb 310 emits a UV light having a wavelength of 185 nanometers.

Figure 4:
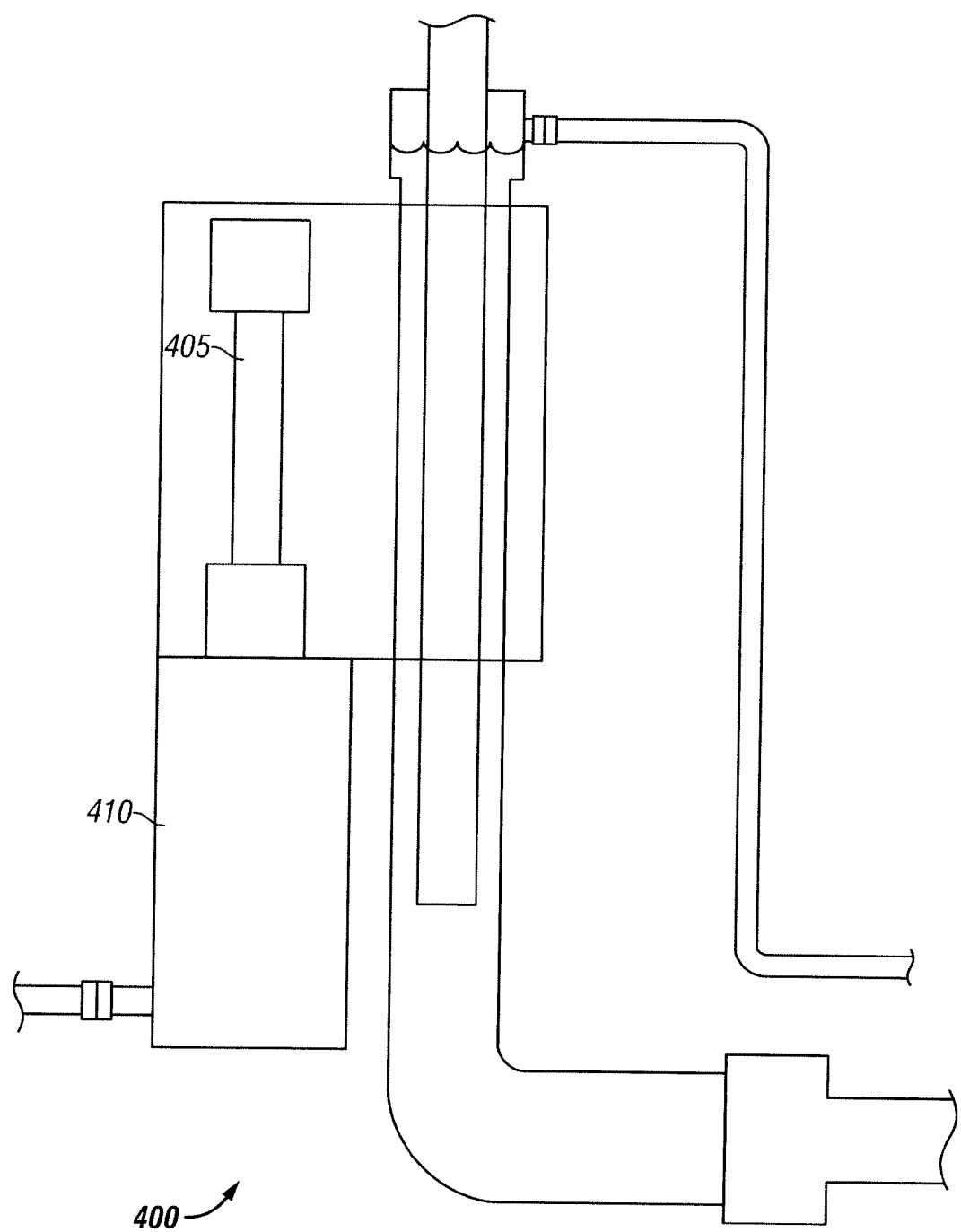

FIG. 4 illustrates sanitizing system 400 in accordance with another embodiment of the present invention. Sanitizing system 400 is similar to system 300 and may incorporate some or all of the features of system 300. For example, bulb 405 is similar to bulb 305. Bulb 405 is configured to transmit UV light at a wavelength or range of wavelengths that is germicidal while also having ozone disassociating property. In one embodiment, bulb 405 emits a wavelength range of 250-280 nanometers. Preferably, bulb 405 emits a wavelength of 260 nanometers. As shown in FIG. 4, system 400 includes an ozone generator 410 which is configured to generate ozone gas using a conventional method such as, for example, corona discharge, cold plasma or other suitable method. Even though ozone generator 410 is shown to be next to bulb 405, generator 410 may be located elsewhere in system 400.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A water treatment system comprising:
    a chamber having an inlet for receiving ozonated water and a transparent portion configured to allow UV light to pass;
    a UV light source having a first portion and a second portion, the first and second portions configured to effectively pass UV light from a single light bulb at a first wavelength and a second wavelength, respectively; and
    a housing having an air inlet and an air outlet, the housing configured to secure the UV source and to receive a portion of the chamber, wherein the UV source and the chamber are affixed to the housing such that the inside of the transparent portion of the chamber is exposed to the first portion of the UV light source for killing bacteria and disassociating ozone molecules within the ozonated water and wherein the second portion of the UV light source is configured to convert oxygen molecules to ozone molecules in the air between the air inlet and the air outlet, and separate from the chamber, to form ozone gas.

2. The water treatment system of claim 1, wherein the chamber comprises entirely of the transparent portion.

3. The water treatment system of claim 1, wherein the first wavelength is set at a wavelength where micro organisms are killed and ozone molecules are disassociated.

4. The water treatment system of claim 3, wherein the first wavelength has a range of 250-280 nanometers.

5. The water treatment system of claim 1, wherein the transparent portion is configured to allow UV light to pass without altering a wavelength characteristic of the UV light.

6. The water treatment system of claim 1, wherein the second wavelength is set at a wavelength where oxygen molecules are converted to ozone molecules.

7. The water treatment system of claim 6, wherein the second wavelength has a range of 170-200 nanometers.

8. The water treatment system of claim 1, wherein the UV light bulb is configured to emit a first range of wavelength, and wherein the transparent portion of the chamber is configured to alter the first range wavelength to kill micro organisms and disassociate ozone molecules.

9. The water treatment system of claim 1, wherein the UV light bulb is configured to emit a first range of wavelengths, and wherein the first portion of the UV light is configured to alter the first range of wavelengths to kill micro organisms and disassociate ozone molecules.

10. The water treatment system of claim 1, wherein the first and second wavelengths generated by the first and second portions of the UV light are the same, and wherein the transparent portion of the chamber is configured to alter the first wavelength such that it will eliminate micro organisms and disassociate ozone molecules.

11. The water treatment system of claim 1, further comprising a wavelength transformer placed inside the housing between the first portion of the UV light source and the transparent portion of the chamber, wherein the wavelength transformer is configured to transform the first wavelength such that it will eliminate micro organisms and disassociate ozone molecules.

12. The water treatment system of claim 10, wherein the first and second wavelengths are selected such that they convert oxygen molecules into ozone molecules.

13. The water treatment system of claim 10, wherein the air inlet and outlet are positioned such that air flow from the air inlet passes through the first and second portions of the UV light source to the air outlet.

14. The water treatment system of claim 1, wherein the transparent portion comprises quartz, glass or plastic.

15. A sanitizing system comprising:
    a chamber to hold a water-ozone combination fluid, the chamber having a transparent wall; and
    a single UV light bulb having a first portion and a second portion, wherein the first portion being coupled to the chamber such that the inside of the transparent wall is exposed to UV light of a first wavelength generated by said single UV light bulb for killing micro-organisms and disassociating ozone molecules in the water-ozone combination fluid in the chamber, and wherein the second portion has a second wavelength configured to convert oxygen molecules into ozone molecules for generating ozone gas outside of the chamber.

16. The sanitizing system of claim 15, wherein the first wavelength is approximately 260 nanometers.

17. The sanitizing system of claim 15, wherein the second wavelength is approximately 185 nanometers.

18. The sanitizing system of claim 15, wherein the transparent wall is configured to allow UV light to pass without altering a wavelength characteristic of the UV light.

19. The sanitizing system of claim 15, further comprising a wavelength converter disposed between the UV light source and the chamber, wherein the wavelength converter converts a wavelength of the UV light to a second wavelength that kills micro-organisms and separates ozone molecules.

20. The water treatment system of claim 1, wherein the air outlet is in fluid communication with a mixer configured to mix the generated ozone gas with water to form the ozonated water, the mixer being disposed upstream of the chamber.

21. The water treatment system of claim 20, wherein the UV light source is parallel to the direction of fluid flow through the chamber.

* * * * *